Aug. 9, 1932.  E. B. STIMPSON  1,870,391
TUBULAR RIVET DRILLING MACHINE
Filed March 8, 1928   4 Sheets-Sheet 4
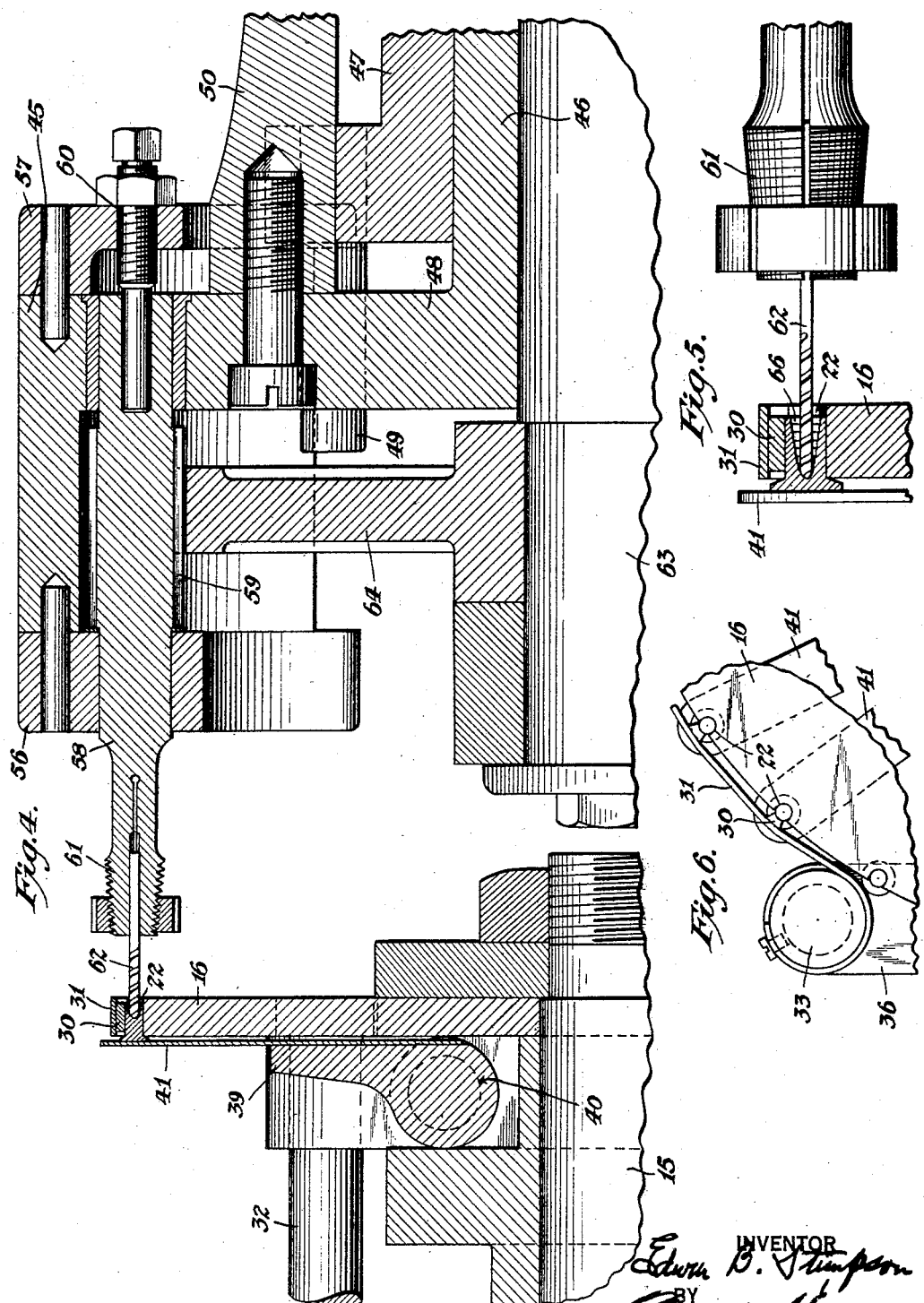

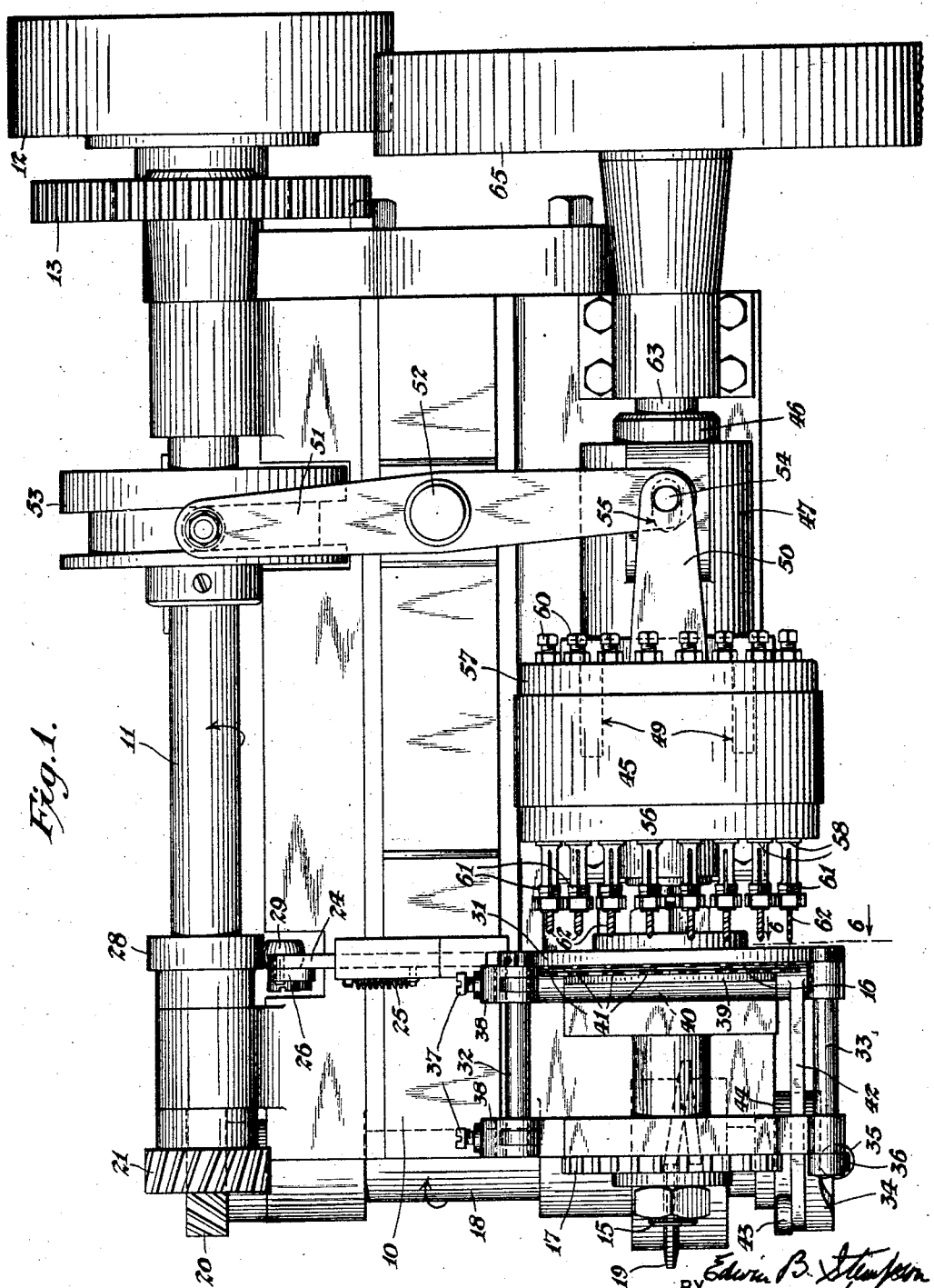

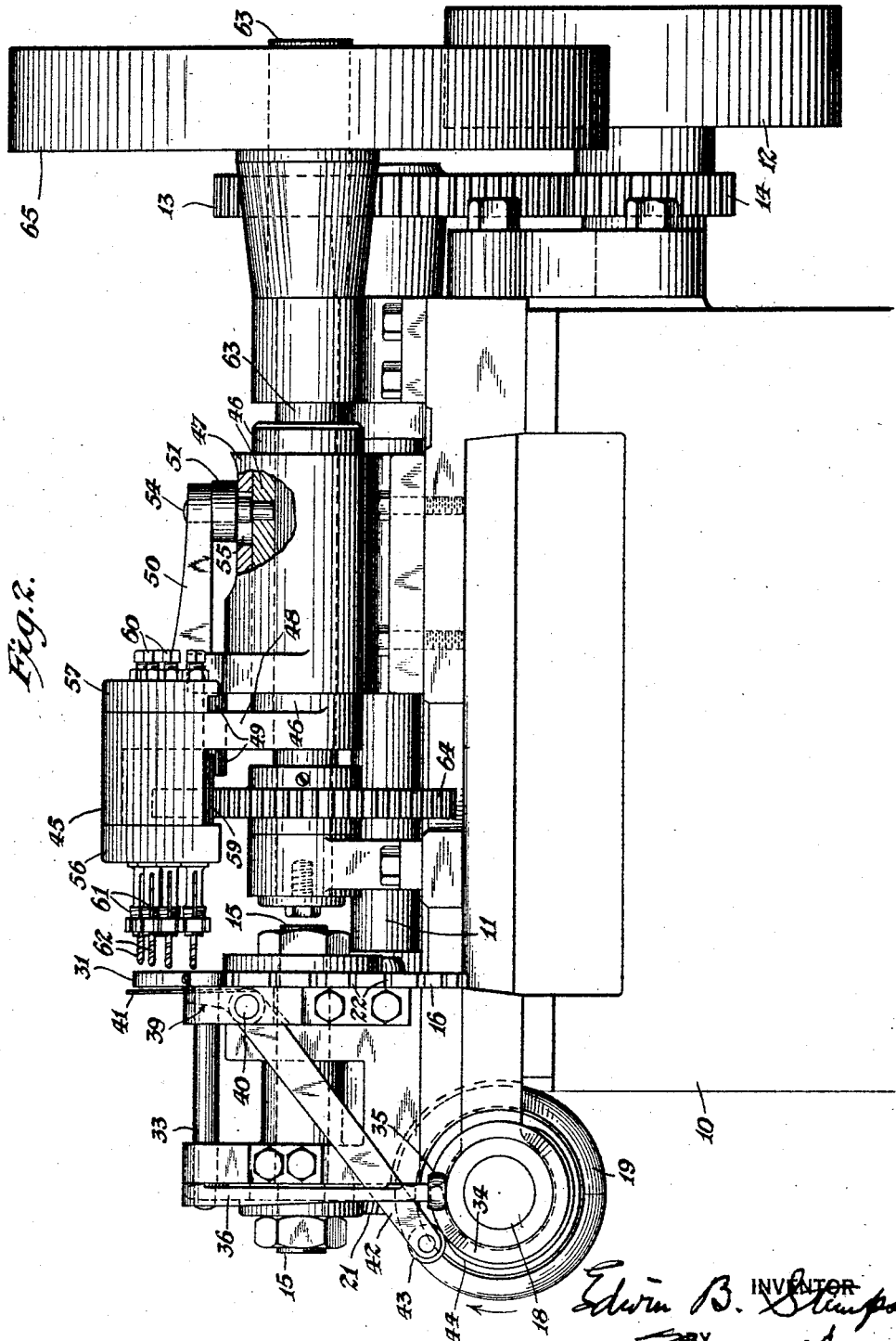

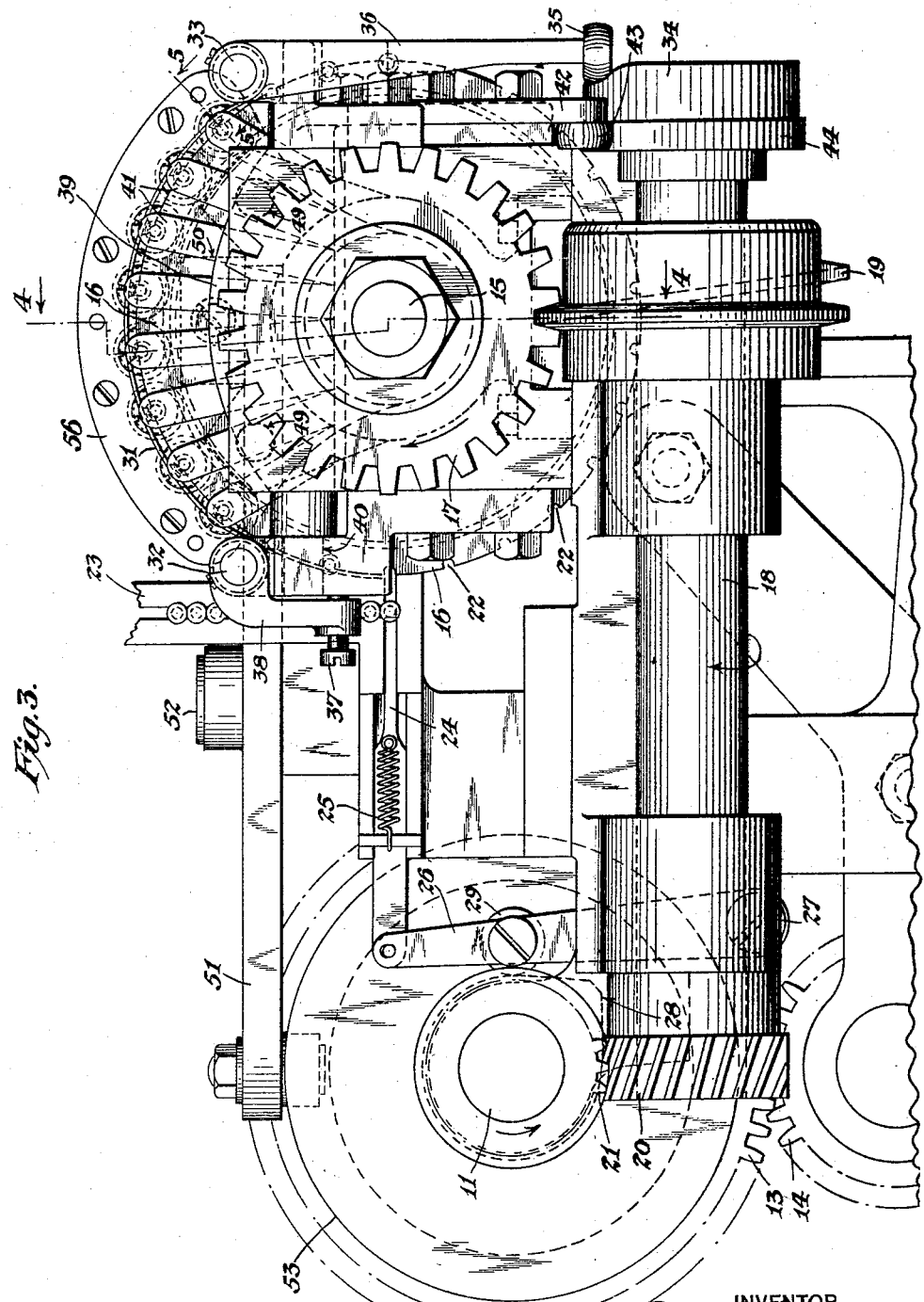

Patented Aug. 9, 1932

1,870,391

UNITED STATES PATENT OFFICE

EDWIN B. STIMPSON, OF BROOKLYN, NEW YORK, ASSIGNOR TO EDWIN B. STIMPSON COMPANY, OF BROOKLYN, NEW YORK, A CORPORATION OF NEW YORK

TUBULAR RIVET DRILLING MACHINE

Application filed March 8, 1928. Serial No. 259,991.

This invention relates to drilling machines, particularly to machines for use in drilling the shanks of rivets or similar devices.

A special object is the provision of a machine which will take a plurality of cuts into the shank of the fastener by means of a number of separate drills, mechanism being provided for clamping the rivets during the drilling operation as well as for moving the rivets to the sequential drilling positions.

A further object of the invention relates to the provision of such a machine in which the drills make cuts of successively smaller diameter, thereby producing a tapered bore in the shank of the fastener.

Other objects and advantages of the invention will become apparent as the description proceeds.

While a preferred embodiment of the invention has been disclosed for purposes of illustration, it should be understood that various changes may be made in the structure without departing from the spirit and scope of the invention as hereinafter set forth and claimed.

In the drawings:

Fig. 1 is a top plan view of the machine.

Fig. 2 is a side elevation of Fig. 1.

Fig. 3 is an enlarged fragmentary front elevation.

Fig. 4 is a longitudinal section on the line 4—4 of Fig. 3.

Fig. 5 is a detail section on the line 5—5 of Fig. 3, enlarged.

Fig. 6 is a detail elevation taken on the line 6—6 of Fig. 1.

Referring to the drawings more particularly, the reference numeral 10 is applied to the supporting frame of the machine. Upon this frame is mounted mechanism for feeding and holding the rivets, and a suitable drill head for making successive cuts into each rivet.

A cam shaft 11 is journaled on the frame 10 and is driven from pulley 12 by gears 13 and 14. A short stub shaft 15 is mounted on the frame parallel to shaft 11, and the inner end of this shaft supports the carrier disc 16, (Fig. 3) while the cam wheel 17 is attached to the outer end thereof.

The stub shaft is driven from the cam shaft 11 by a counter shaft 18 which carries a spiral cam 19 engaging the teeth of the cam wheel 17 and is geared to shaft 11 by spiral gears 20 and 21. A series of rivet-receiving recesses 22 are formed in the periphery of the disc 16, and the cam 19 is shaped so as to move the recesses 22 successively from one drilling position to another, (in a clockwise direction as viewed in Fig. 3) and to hold the disc against rotation while the drill head is moving toward the carrier disc.

The rivets are fed from an inclined guideway 23 of well-known type into the recesses 22 by a plunger 24 which is retracted by a spring 25 and which is reciprocated by a lever 26, pivoted at 27 and moved by means of a cam 28 carried by shaft 11 and engaging a roller 29 mounted on lever 26.

In order to hold the rivets firmly during the drilling operation their shanks are pressed into the recesses 22 by blocks 30 secured to a steel clamping band 31, (Figs. 6 and 3) the ends of which are secured to the shafts 32 and 33, respectively. During the normal operation of the machine the band 31 is tightened by rotation of shaft 33, said rotation being caused by the engagement of cam 34 on the end of shaft 18 with a roller 35 mounted on lever 36 which is keyed to shaft 33. The effective length of the band, and hence its clamping action, can be adjusted by means of the screws 37 which are threaded through the levers 38 keyed to shaft 32 and operate to change the angular adjustment of shaft 32.

Further clamping means is provided in the form of a reciprocating die 39 which presses against the heads of the rivets during the drilling operation. This die is pivoted on the shaft 40 and carries a plurality of fingers 41 which are spaced to aline with the notches 22 during the dwell of the holder disc 16, the die being reciprocated by an arm 42 which carries a roller 43 engaging a cam 44 on shaft 18.

The drilling mechanism includes a reciprocating drill head 45 carrying a plurality of rotating drills. A sleeve 46, which is part of the drill head, is slidable within a guide block 47 mounted on the frame, and the vertical branch 48 of the head engages a plurality of guide rails 49 to preserve the alinement of the drill head. An arm 50 is secured to the head and projects rearwardly to pivotally engage an end of lever 51, which is fulcrumed at 52 and at its rear end carries a roller engaging the barrel cam 53. The pin 54 which connects arm 50 and lever 51, extends through a slot 55 in guide block 47 and engages in a hole formed in sleeve 46. The barrel cam 53 is adjustably splined to the shaft 11.

The upper end of the drill head is arc-shaped, and carries a front plate 56 and a rear plate 57, and a plurality of drill shafts 58 extend through the head and are formed with relatively wide gears 59 between the plates 56 and 57. Suitable means for adjustably taking up the thrust of the drill shafts is provided, and in the form illustrated this thrust means takes the form of an adjustable thrust screw 60 engaging a pin in a socket formed in the rear end of each drill shaft. The forward end of each drill shaft is provided with a chuck 61 for holding a drill 62, and the drills are arranged so that they are of successively smaller sizes and of increasing length from the left to the right as seen in Fig. 3. The drill shafts 58 are driven from the shaft 63 by a gear 64 which slidably engages each of the gears 59, a pulley 65 being used to rotate the shaft 63.

The machine operates in the following manner:

During the dwells of the carrier disc 16 the feed mechanism delivers the rivets to the notches 22 of the carrier disc, with the heads of the rivets lying on the forward face of the disc 16, (Fig. 3). The intermittent clockwise movement of said disc carries each rivet through the successive drilling positions, and after the rivet has passed the drills it falls by gravity into a discharge chute, or other receptacle, not shown.

During each dwell of the carrier disc the cam 34 operates to clamp the band 31 to cause the clamping blocks 30 to engage the shanks of the rivets, and simultaneously the cam 44 moves the die 39 to press fingers 41 against the heads of the rivets.

The drills 62 are continuously rotated and the movements of the drill head are so timed that the head is retracted in inoperative position during the advancing movement of the carrier disc, and the head is advanced to drilling position after the disc has begun its dwell and the rivets have been firmly clamped as before explained.

The first drill is the shortest and is of largest diameter, and the stroke of the drill head is arranged so that this drill makes only a shallow cut into the rivet as indicated at 66 in Fig. 5. Each successive drill is longer and of smaller diameter, so that after the last drilling operation each rivet has a conical hole extending into its shank as indicated in Fig. 5. By using this arrangement of successively smaller drills the lateral friction of the drilling operation is reduced, and the base of the shank next to the head is kept at a maximum strength.

The machine as described embodies one drive for the drills and a separate drive for the rest of the operating mechanism, a construction which permits rotating the drills at high speed, while the other parts can be run at a much lower rate without complicated gearing and the consequent excessive friction.

I claim:

A rivet drilling machine comprising a carrier disc having its periphery provided with a series of notches to receive the shanks of rivets to be drilled, a clamping band extending circumferentially over a portion of the periphery of said disc, clamping blocks carried by said band and spaced thereon distances corresponding to the distances between said notches in said disc, means to rotate said disc step by step to present notches therein beneath the blocks on the clamping band during the dwells of the disc, means to feed shanks of rivets into said notches during said dwells, means to apply tension to said clamping band during said dwells to cause said clamping blocks to tightly clamp the shanks of said rivets in said notches and to lift said blocks from the shanks of said rivets when said disc is moving step by step, and means to drill the clamped rivets.

In testimony whereof I affix my signature.

EDWIN B. STIMPSON.